Sept. 7, 1965   D. H. LYMBURNER ETAL   3,204,705
BUFFER SPRING FOR DISK TILLER
Filed April 1, 1964   2 Sheets-Sheet 2
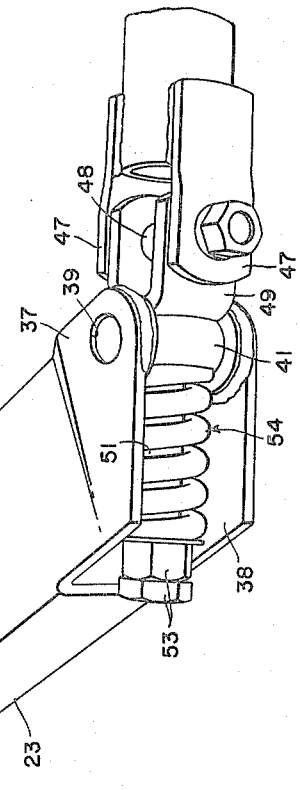
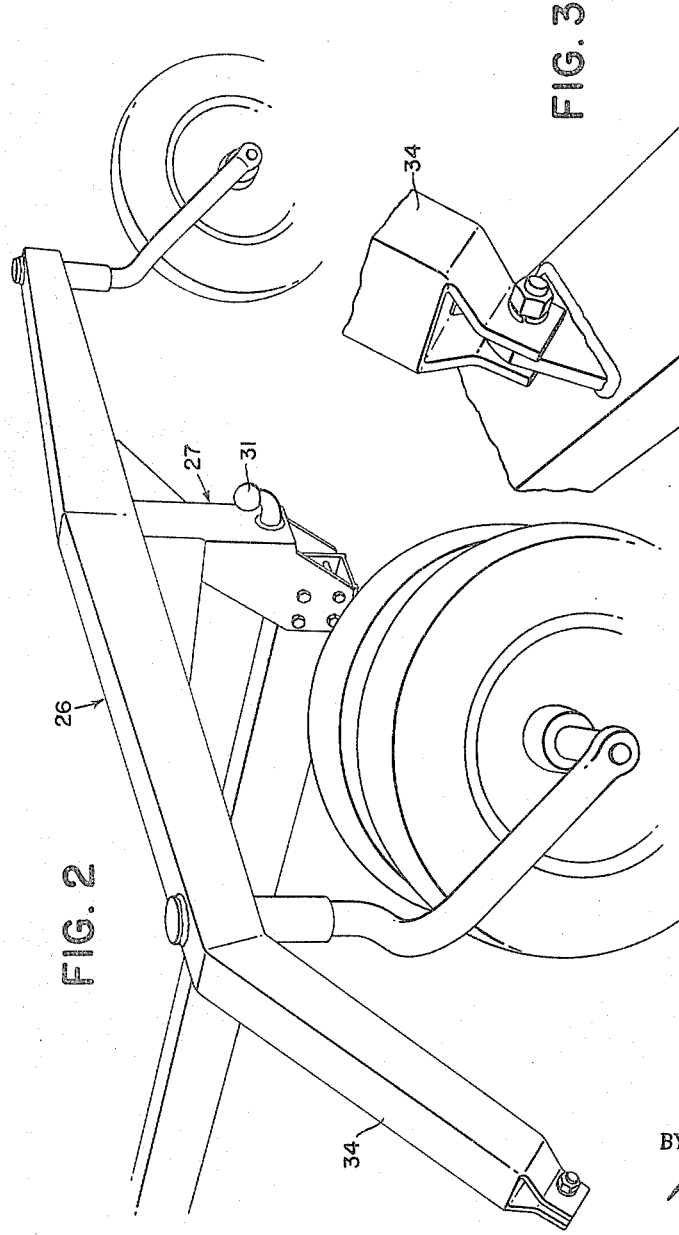
INVENTORS
DOUGLAS H. LYMBURNER
HENNING ISACHSEN
BY
ATTORNEY

United States Patent Office 3,204,705
Patented Sept. 7, 1965

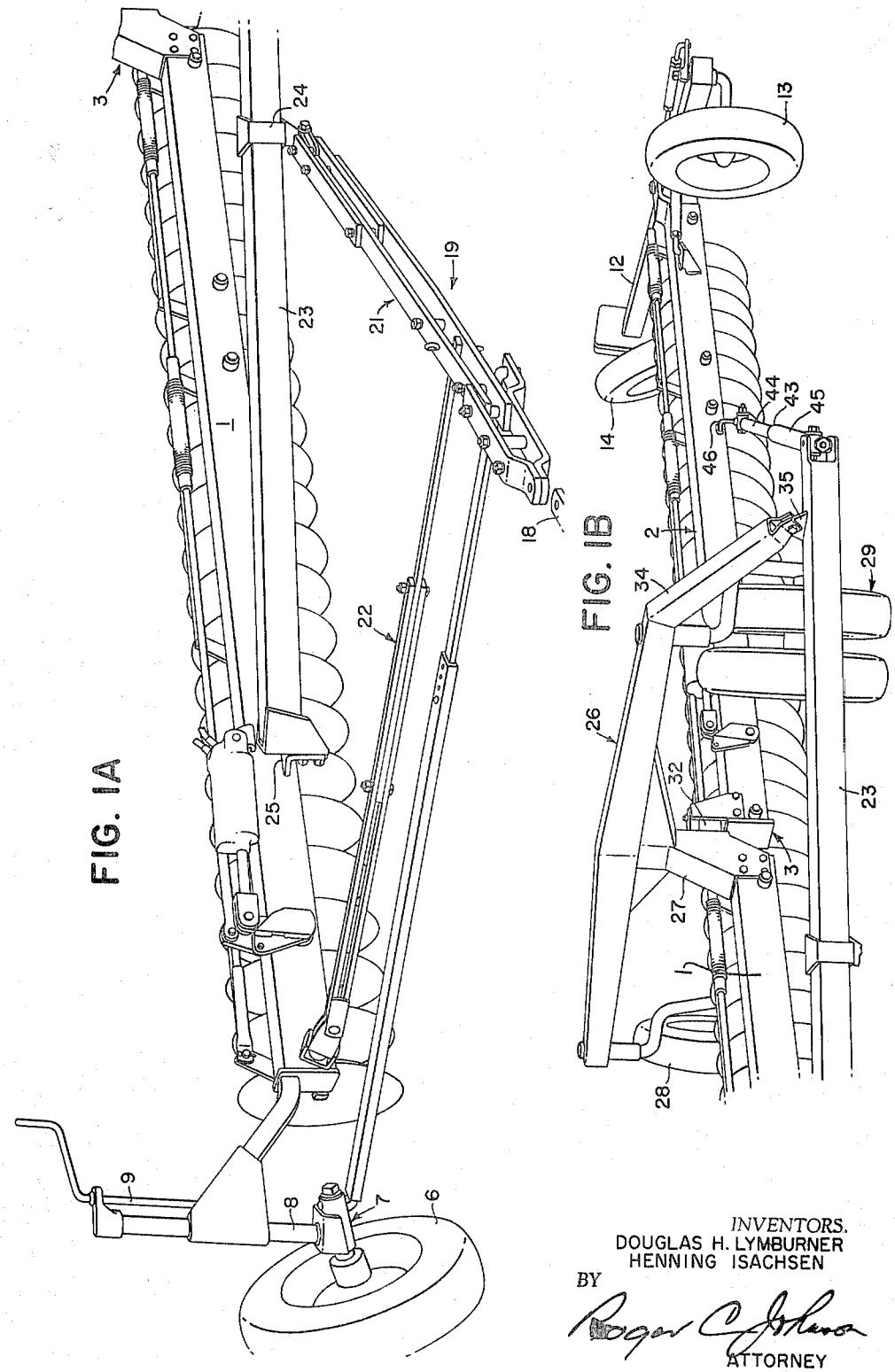

3,204,705
BUFFER SPRING FOR DISK TILLER
Douglas H. Lymburner, Fonthill, Ontario, and Henning Isachsen, St. Catherines, Ontario, Canada, assignors to Deere & Company, Moline, Ill., a corporation of Delaware
Filed Apr. 1, 1964, Ser. No. 356,424
1 Claim. (Cl. 172—286)

This invention relates generally to agricultural implements and more particularly to relatively wide implements, such as disk tillers, used principally on farms involving large acreages.

The object and general nature of this invention is the provision of a new and improved implement, such as a disk tiller, wherein hingedly connected frames are employed to facilitate making turns, usually in one direction only, with spring cushioned stop means interconnected between the hingedly interconnected sections so as to cushion or relieve impact loads when the outfit has completed a turn and begins to move in a straight line. More specifically, it is a feature of this invention to provide a disk tiller having two interconnected frame sections, one of which receives a more or less conventional hitch frame and the other section of which is hingedly connected so as to fold in a generally horizontal direction toward the hitch frame and thus facilitate making a turn in one direction, with a buffer spring means so constructed and arranged to cooperate with motion limiting means that is adapted to limit hinging movement beyond a position where the two sections are in alinement, the buffer spring substantially eliminating impact loads at the point where the relative movement between the frame sections is terminated.

These and other objects and advantages of the present invention will be apparent to those skilled in the art after a consideration of the following detailed description, taken in conjunction with the accompanying drawings, in which:

FIGS. 1A and 1B are perspective views of the front and rear portions, respectively, of a relatively large hinged disk tiller incorporating the principles of this invention, FIGS. 1A and 1B showing the disk tiller in its normal operating position.

FIG. 2 is a detailed view of the hinge connection between the two frame sections of this implement.

FIG. 3 is an enlarged perspective view of the buffer spring and associated parts.

Referring first to FIGS. 1A and 1B, the disk tiller in which this invention has been incorporated includes two frame sections 1 and 2 normally disposed in longitudinal alinement and hingedly interconnected at their adjacent ends by ball and socket means 3 to which detail reference will be made below. The implement is normally operated with the frames 1 and 2 arranged in a diagonal position, relative to the direction of forward travel, and the front end of the front frame section 1 is supported on a front furrow wheel 6 journaled on axle means 7 carried at the lower end of a vertical spindle 8, the vertical position of which relative to the main frame can be adjusted by crank screw 9. The rear end of the rear frame section 2 is carried on a fore-and-aft extending frame bar 12 supported at its front end on a land wheel 13 and at its rear end on a rear furrow wheel 14.

The implement is propelled by means of a tractor, represented by the drawbar 18, which is connected to the disk tiller frame by a draft frame 19. The draft or hitch frame 19 comprises a pair of adjustable bars 21 and 22 connected in any suitable way at their rear ends with the front end of the front frame section 1 and with a transversely extending hitch beam 23, the connection with the latter member being adjustable, as by a slidable clamp 24. The right end of the hitch beam 23 is connected in any suitable way, as by a bracket 25, with the front frame section 1, and the left end of the hitch frame beam 23 is supported on the front end of a fore-and-aft extending beam 26 that is connected at its midpoint with a supporting bracket 27 carried at the rear or left end of the frame 1. The rear end of the fore-and-aft extending frame 26 is carried on a castering wheel 28 and the front end of the frame structure 26 is supported on a dual castering wheel 29.

As best shown in FIG. 1B, the fore-and-aft extending frame structure 26 is fixed rigidly to the upwardly extending bracket 27. As shown in FIG. 2, this bracket 27 carries a ball joint 31 that cooperates with socket means 32 (FIG. 1B) fixed to the front end of the rear frame section 2, whereby the frames 1 and 2 are adapted to swing both vertically and horizontally relative to one another, generally like the frame arrangement shown in the patent to Davis 1,256,984.

The frame structure 26 includes a forwardly and downwardly extending section 34 that is pinned to a bracket 35 carried by the left or inner end of the hitch beam 23. As best shown in FIG. 3, the beam 23 carries upper and lower plate extensions 37 and 38 which are apertured, as at 39, to receive a trunnion 41. The left end of the hitch beam 23 is connected with the frame 2 by means of a telescopically arranged link 43 that is made up of an inner section 44 and an outer section 45. The rear end of the inner section 44 is connected by means of a bracket 46 with the rear frame section 2, and the forward end of the forward section 45 carries a pair of apertured lugs 47 (FIG. 3) through which a pivot bolt 48 extends. Disposed on the bolt 48 between the lugs 47 is a yoke 49 carrying a stem 51 that extends forwardly through the trunnion 41 and is threaded at its forward end to receive a pair of lock nuts 53. A buffer spring 54 is disposed about the stem 51, the latter and the spring 54 lying between the plate sections 37 and 38.

As will be seen from FIGS. 1A and 1B, the implement may readily be turned to the left by turning the tractor in that direction and the front frame section 1 swings horizontally relative to the rear frame section 2 by virtue of the fact that the sections 44 and 45 of the connection 43 may telescope one within the other. When the turn is completed and the tractor is driven forwardly again in a straight line, the frame sections 1 and 2 swing back into longitudinal alinement. During this action, the spring 54 serves as a cushioning spring or buffer spring to reduce impact loads when the telescopic sections 44 and 45 reach their full extent of movement, at which time the frame sections 1 and 2 are in longitudinal alinement.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

In a disk tiller having a main frame and an auxiliary frame connected to be in alignment in a generally diagonal direction and hinged to swing out of alignment in a generally horizontal plane, as to facilitate making a left turn, hitch means connected with said main frame, connecting means interconnecting said hitch means and said auxiliary frame to permit limited movement of the hitch towards and away from the auxiliary frame as the main frame swings towards the auxiliary frame, as when making a left turn, and as the main frame swings away from the auxiliary frame to a position of alignment, a shock cushioning structure to limit impact forces when the frames swing back into a position of alignment, said shock cushioning structure including a trunnion swingably mounted on one of said means, a yoke pivoted to the other of said means and having a stem slidably disposed in said trunnion, a buffer spring surrounding said stem and bearing at one end against said trunnion, and adjustable nuts threaded onto the outer end of said stem and receiving the other end of said buffer spring.

References Cited by the Examiner

UNITED STATES PATENTS

| | | | |
|---|---|---|---|
| 2,943,692 | 7/60 | Hyland et al. | 172—678 X |
| 3,066,746 | 12/62 | Sweet | 172—584 X |

ANTONIO F. GUIDA, *Acting Primary Examiner.*

T. GRAHAM CRAVER, *Examiner.*